(No Model.)
W. W. STEWART.
FOUNTAIN PEN.
No. 378,986. Patented Mar. 6, 1888.
WITNESSES:
Arthur Wilton
Albert Comstock
INVENTOR:
William W. Stewart.
By his Attorneys,
Arthur C. Fraser & Co.

UNITED STATES PATENT OFFICE.

WILLIAM W. STEWART, OF BROOKLYN, NEW YORK.

FOUNTAIN-PEN.

SPECIFICATION forming part of Letters Patent No. 378,986, dated March 6, 1888.

Application filed August 4, 1886. Serial No. 209,952. (No model.)

*To all whom it may concern:*

Be it known that I, WILLIAM W. STEWART, a citizen of the United States, and a resident of Brooklyn, in the county of Kings and State of New York, have invented certain new and useful Improvements in Fountain-Pens, of which the following is a specification.

This invention relates to fountain-pens of that class wherein the tubular handle or ink-reservoir is closed at its upper end and the ink is conducted to the pen through a duct, its place in the reservoir being taken by air entering at the lower end.

My Patent No. 214,795, dated April 29, 1879, illustrates a holder having two or more vents arranged to alternately discharge ink and admit air, the object being to prevent interference between the ink and the bubbles of air.

My Patent No. 222,959, dated December 23, 1879, illustrates a holder having a wire arranged in the ink-duct in order to conduct upward the entering bubbles of air without permitting them to accumulate and coalesce.

My Patent No. 314,547, dated March 24, 1885, shows a feed pipe or bar projecting through the nozzle and formed with an ink-duct through it leading to the under side of the pen. It also shows a slitted "film-tube" or vent-tube extending through the center of the holder, with its lower end entering the feed-pipe and communicating with the duct therein, and a slit in the feed-pipe forming a continuation of that in the vent-tube.

My present invention involves features found in my said patents and introduces some improvements in the construction of fountain-pens of this character designed chiefly to better control the movements of the ink and air and to keep the pen clean and bright.

Figure 1 of the accompanying drawings is a side elevation of my improved pen. Fig. 2 is a longitudinal mid-section thereof with the cap or cover in place. Fig. 3 is a fragmentary longitudinal section of the holder, looking up from beneath and showing the feed bar or pipe and film-tube in elevation. Fig. 4 is an enlarged transverse section cut on the line 4 4 in Fig. 3. Fig. 5 is a plan of the feed-bar. Fig. 6 is a plan of the film-tube or vent-tube; and Fig. 7 is a vertical longitudinal section of the feed-bar, showing a portion of the vent-tube within it in elevation. The remaining views illustrate modifications. Fig. 8 is a longitudinal section through the holder, and Fig. 9 is a plan of its feed-bar. Fig. 10 is a longitudinal section through another construction of holder with its cap or cover on, and Fig. 11 is a plan of its feed-bar. Fig. 12 is a longitudinal section through another modification of holder, and Fig. 13 is its feed-bar; and Fig. 14 shows a modification of the vent-tube.

Referring, first, to Figs. 1 to 7, inclusive, let A designate the pen or pen-nib; B, the reservoir-holder, closed at its upper end; C, the removable cap (shown in Fig. 2) for inclosing the pen when not in use; D, the nozzle or tubular plug closing the lower end of the reservoir B; E, the feed pipe, bar, or plug, and F the film-tube or vent-tube.

The nozzle D screws into the holder B and forms a continuation thereof, its lower portion forming the "tubular extension" or jacket G, claimed in my Patent No. 237,454, dated February 8, 1881. Inside of this nozzle the feed-bar E fits snugly. In the construction shown this bar has no shoulder to limit its movement, so that it may be set to different positions in the nozzle. The pen A is held between the feed-bar and the bore or throat $d$ of the tubular nozzle D, as usual. This throat has a shoulder, $c$, to limit the upward movement of the pen A.

The film-tube or vent-tube F is slitted from end to end along one side with a capillary slit, $f$. (Best shown in Fig. 6.) Its lower end is thrust into the bore of the feed-bar E. This feed-bar is of cylindrical form, except over its lower portion, which projects beyond the tubular extension G, which portion is contracted into the form of a beak or finger, which rests close against the under side of the pen, as shown in Fig. 2. The bore of this bar, which is made a tight fit with the vent-tube F, extends entirely through it from end to end. The tube F is, by preference, passed through this bore until its lower end emerges beneath, as shown in Figs. 3 and 7. The feed-bar is, by preference, roughened on its upper surface to form a series or net-work of capillary interstices, $a$ $a$, coming against the pen. This is best done by means of crossed grooves, as shown in Fig. 5. These interstices answer, in a general sense, to the capillary grips in my Patent No. 314,547. They constitute, essentially, a feeder-recess beneath the pen and serve to hold a quantity of ink in contact with the under side of the pen ready to be drawn upon in making a shading stroke; but the ink is so subdivided that it is completely under capillary influence and cannot roll or drop out of the pen under the influence of gravitation, as it would be apt to do if an undivided or spoonlike feeder-recess were used. These grooves or interstices communicate with the interior of the holder by means of the duct or bore $e$ through the tube F, the slit $f$ therein, and a row of holes, $b\ b$, through the upper side of the feed-bar. The tube F is turned with its slit $f$ uppermost, so that this slit coincides with the row of holes $b\ b$. Hence the ink may flow from the reservoir into the tube F through its slit $f$, (or through the open top of the tube if the holder is nearly full of ink,) then down through the slit or down the bore in the tube, as the case may be, and thence up through the holes $b\ b$ to the interstices $a\ a$, and thence down to the point of the pen.

The vent-tube F extends entirely through the feed-bar E and is open at its lower end. Thus the bore or duct $e$ affords a direct communication or vent between the upper part of the holder and the outer air beneath the pen. As the ink gradually flows out to supply the pen, air ascends through the bore $e$ to take its place, thus maintaining the equilibrium of pressure within the reservoir. This construction is clearly shown in Fig. 8. In practice, however, it is found desirable to subdivide this bore $e$ in order to impede and somewhat retard the flow of both ink and air. This I accomplish by filling the bore $e$ with obstructions $g\ g$, which are preferably continuous, and may be wires, bristles, threads, or other suitable things. I prefer pieces of broom-corn for this purpose, on account of their smooth hard surfaces and somewhat permeable substance, which acts most perfectly to maintain a moist condition without being soaked or swelled by the action of the ink. The effect of these obstructions is not only to retard the flow of air, but also to maintain the ascending air in a subdivided condition, preventing the formation in the vent-tube of air bubbles or sacs, which are liable to burst and thereby scatter ink upon the paper, and maintaining the air in a saturated or frothy condition. The ink has an unobstructed duct leading downward to the pen through the slit $f$, so that there is no necessary interference between the ink and air, and ink is not liable to force its way into the bore $e$. I also insert in the vent-tube a slender wire, $h$, on the end of which is a head or cap or stopper, $i$, which is adapted to fit against the lower end of the tube F and to close the opening thereof to the outer air. This head $i$ may be moved up or down in order to regulate to a nicety the admission of air, and consequently the freedom of flow of the ink. It is retained in any position by the friction of the wire $h$ against the broom-corn or other obstructions $g$. This head or cap $i$ will be used chiefly to close the vent when the pen is put into the pocket. Instead of a wire, $h$, one of the broom-corn filaments may be used, the head $i$ being then a drop of sealing-wax on its end.

In order to insure the closing of the head $i$ against the end of the vent-tube when the pen is to be put into the pocket, I provide the cap or cover C with a pin, $j$, which, when the cap is applied to cover the pen A, comes against the head $i$, as shown in Fig. 2, and as the cap is pressed up to its place this pin pushes up the head until it closes the vent.

It will be observed from Fig. 6 that the interstices $a\ a$ on the bar E have no communication with the ink-reservoir except through the holes $b\ b$ and slit $f$, both of which are capillaries, so that the ink is kept continually under capillary attraction until it reaches the pen.

The bar E and tube F are made in separate pieces, mainly for convenience. They might be formed both in one, if desired, without essentially changing the operation of the pen. I prefer, however, to make them separate, as by this means they may be relatively adjusted—that is, the tube F may be set higher or lower in the bar and it may be turned slightly to partially cut off or reduce the communication between the slit $f$ and the holes $b$.

My present invention provides, as I believe, the first fountain-pen having a vent-duct leading down from the air-space in the ink-reservoir and opening to the outer air beneath the pen. My pending application Serial No. 189,383, filed January 22, 1886, and allowed June 24, 1886, involves this feature to some extent; but I elect to claim it generically in this application rather than in that. I am aware that fountain-pens have been invented having a vent-duct extending from near the bottom of the reservoir upward and opening to the outer air at the top of the holder. These, however, are quite the reverse of my device both in construction and operation.

I will now proceed to describe the modified constructions illustrated in the drawings.

Fig. 8 shows a pen wherein the feed-bar E has no cross grooves or interstices $a\ a$ on its upper side; but in place of these and in place of the holes $b\ b$ is a capillary slit, $b$, (best shown in Fig. 9,) extending longitudinally and coinciding with the slit $f$ in the vent-tube. The effect is nearly the same as in the construction first described. The nozzle D is grooved internally at $k$ on its upper side, and in this groove is inserted an "irritant," $l$, consisting of a piece of fine wire, or a bristle, or a piece of broom-corn. This extends down on top of the pen-nib and may serve to conduct ink down to the pen, or to admit air to the reservoir, as the conditions existing in the holder may determine.

Fig. 10 shows a pen having a feed-bar of still different construction. The upper part of the bar is cut away at $m$ (see Fig. 11) to form a cavity or chamber to hold a mass of ink. This construction is most suitable for pens for heavy writing. The bar has cross grooves or interstices *a a* and a capillary slit, *b*, extending downward from the chamber *m*. The flow of ink from the reservoir to the chamber *m* is determined by the capillary slit *f*, as before. The obstruction *g* in the vent-tube F consists of a piece of broom-corn bent double and inserted into the bore thereof. The head *i*, for closing the end of the vent-tube, is not carried by a wire in the latter, but is mounted on the end of the pin *j* in the cap C.

Figs. 12 and 13 show another modified construction. The feed-bar E has its slit *b* extended quite to its upper end. This is inadvisable of itself, as it is likely to promote too free and uncontrolled a flow of ink; but this result is prevented in this construction by inserting a capillary strand, *n*, or some obstruction, which in this case consists of a piece of broom-corn. The vent-tube F is not slitted, but has a row of holes, *f'*, beneath the slit *b*, and its upper portion is provided with holes *p p*. The strand *n* is carried up on top of the tube until it reaches the first hole *p*, when it enters the tube, passing out beneath the latter through another hole *p*. This strand takes to some extent the place of the capillary slit *f*, as it affords a capillary line down which the ink may run to supply the pen. The lower end of the strand projects into the feeder-recess *a*, which in this construction is an undivided recess or spoon.

Fig. 14 shows a vent-tube, F, constructed of drawn wire, made half-round, and grooved on one side. A piece is bent upon itself and a hole, *q*, formed at the bend for communication with the reservoir. Holes may be drilled in its sides, or the halves may be separated very slightly, so as to open capillary slits at the joints.

I claim as my invention—

1. A fountain-pen constructed with a vent-duct leading from the air-space in the ink-reservoir and opening to the air beneath the pen and communicating with the under side of the pen, substantially as set forth.

2. A fountain-pen constructed with a vent-duct leading from the air-space in the ink-reservoir and opening to the air beneath the pen, and with a capillary conduit for ink opening from said duct to the under side of the pen, substantially as set forth.

3. A fountain-pen constructed with a vent-duct leading from the air-space in the ink-reservoir and opening to the air beneath the pen, and with a capillary conduit extending down from the ink-reservoir and communicating with the pen, substantially as set forth.

4. A fountain-pen constructed with a vent-duct leading from the air-space in the ink-reservoir and opening to the air beneath the pen and communicating with capillary interstices against the pen, substantially as set forth.

5. A fountain-pen constructed with a feed-bar beneath the pen, having capillary interstices against the under side of the pen, and a vent-tube extending from the reservoir down through the feed-bar and terminating beneath the same, substantially as set forth.

6. A fountain-pen constructed with a tubular feed-bar beneath the pen, adapted to conduct ink to the pen, and a vent-tube extending through said feed-bar into the reservoir and adjustable in said bar to different positions, substantially as set forth.

7. A fountain-pen constructed with a tubular feed-bar having capillary holes or slit and a vent-tube inserted in said bar and having a capillary slit coinciding with said holes or slit in the bar, substantially as set forth.

8. A fountain-pen constructed with a capillary slit extending downward from the reservoir and communicating with the under side of the pen, and with a vent-duct extending from the upper part of the reservoir and opening to the air beneath the pen, substantially as set forth.

9. A fountain-pen constructed with a vent-duct extending down from the reservoir and opening to the air beneath the pen, and with obstructions *g* in said duct, consisting of parallel strands filling the same, as described.

10. A fountain-pen constructed with a vent-duct extending down from the reservoir and opening to the air beneath the pen, and with obstructions in said duct, consisting of parallel strands of broom-corn, as described.

11. A fountain-pen constructed with a vent-duct extending from the air-space in the reservoir and opening to the air beneath the pen, and a head or plug, *i*, adapted to close the lower end of said duct, substantially as set forth, whereby the admission of air through said duct is controlled.

12. A fountain-pen constructed with a vent-duct extending from the air-space in the reservoir and opening to the air beneath the pen, a wire or strand, *h*, held frictionally therein, and a head, *i*, on said wire or strand adapted to close the lower end of said duct and adjustable toward or from the same, substantially as set forth, whereby the admission of air through said duct is controlled.

13. A fountain-pen constructed with a vent-duct extending from the reservoir and opening to the air beneath the pen, a head or plug, *i*, adapted to close the lower end of said duct, the cap C, and a pin, *j*, fixed therein for closing said head against said duct, combined and operating substantially as described.

14. The combination, with a reservoir pen-holder and a pen, of a feed-bar located in the end of the holder and provided with a feeder-recess extending beneath a portion of the pen, and a capillary slit or channel leading directly from said recess along the under side of the pen to the reservoir, substantially as set forth.

15. The combination, with a reservoir pen-holder and a pen, of a feed-bar located in the end of the holder and provided with an elongated feeder-recess directly beneath the pen, an ink-conduit leading from the reservoir to a point beneath the feeder-recess, and a capillary slit or channel connecting the feeder-recess, reservoir, and ink-conduit, substantially as set forth.

16. The combination, with the pen-holder and the pen, of an adjustable feed-bar located in the end of the holder and provided with an ink-conduit extending from a point beneath the pen to the ink-reservoir, and with a capillary slit or channel extending from a point below the center of the pen along underneath the pen to its upper end and thence into the ink-reservoir in the holder, substantially as set forth.

17. In a fountain-pen, a feed-bar adjustably secured in the end of a reservoir-holder and provided with a capillary channel extending nearly its entire length, the said channel being open to the outer surface of the plug, and a feeder-recess, the latter being located at the outer end of the plug, substantially as set forth.

In witness whereof I have hereunto signed my name in the presence of two subscribing witnesses.

WILLIAM W. STEWART.

Witnesses:
GEORGE H. FRASER,
HERBERT J. FRASER.